US011270367B2

(12) United States Patent
Abdollahian et al.

(10) Patent No.: US 11,270,367 B2
(45) Date of Patent: Mar. 8, 2022

(54) PRODUCT COMPARISON TECHNIQUES USING AUGMENTED REALITY

(71) Applicant: Apple Inc., Cupertino, CA (US)

(72) Inventors: Golnaz Abdollahian, San Francisco, CA (US); Earl M. Olson, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/843,766

(22) Filed: Apr. 8, 2020

(65) Prior Publication Data

US 2020/0334731 A1 Oct. 22, 2020

Related U.S. Application Data

(60) Provisional application No. 62/836,330, filed on Apr. 19, 2019.

(51) Int. Cl.
*G06Q 30/06* (2012.01)
*G06F 3/01* (2006.01)
*G06T 19/00* (2011.01)

(52) U.S. Cl.
CPC ......... *G06Q 30/0623* (2013.01); *G06F 3/017* (2013.01); *G06Q 30/0643* (2013.01); *G06T 19/006* (2013.01)

(58) Field of Classification Search
CPC ...... G06Q 30/06; G06Q 30/0601–0643; G06F 3/01; G06F 3/017; G06F 3/048–04842; G06T 19/006
See application file for complete search history.

(56) References Cited

U.S. PATENT DOCUMENTS

| 10,387,912 | B2* | 8/2019 | Farshori | G06Q 30/0267 |
| 2012/0299961 | A1* | 11/2012 | Ramkumar | G06T 19/006 345/632 |
| 2013/0293530 | A1* | 11/2013 | Perez | G06F 3/012 345/418 |
| 2015/0084848 | A1* | 3/2015 | Sharma | G06F 3/0383 345/156 |
| 2019/0005327 | A1* | 1/2019 | Ekambaram | G06F 3/011 |
| 2019/0156402 | A1* | 5/2019 | Greenberger | G06K 9/00671 |
| 2020/0202390 | A1* | 6/2020 | Gregori | G06K 9/22 |
| 2020/0279314 | A1* | 9/2020 | Wylie | G06F 3/04847 |
| 2020/0338449 | A1* | 10/2020 | Fan | A63F 13/5372 |

OTHER PUBLICATIONS

Situated Analytics: Demonstrating immersive analytical tools with Augmented Reality. Neven A.M. El Sayed, et al. Jul. 19, 2016. (Year: 2016).*
In-Store Augmented Reality-Enabled Product Comparison and Recommendation. Jesús Omar, et al. University of Duisburg-Essen. Sep. 22, 2020. (Year: 2020).*

* cited by examiner

*Primary Examiner* — William J Allen
(74) *Attorney, Agent, or Firm* — Dentons US LLP

(57) ABSTRACT

The present disclosure generally relates to providing product information. The appearance of a first product and a second product is detected within a field of view of one or more image sensors. Movement of the first product or the second product relative to one another is then detected. If the movement of the first product or the second product relative to one another causes the first product to come within a threshold distance of the second product, then comparison information is displayed at a location at least partially between the first product and the second product.

25 Claims, 13 Drawing Sheets

PRODUCT COMPARISON TECHNIQUES USING AUGMENTED REALITY

CROSS-REFERENCE TO RELATED APPLICATIONS

This application claims priority to U.S. Provisional Application No. 62/836,330, filed Apr. 19, 2019, the entire contents of which is hereby incorporated by reference.

FIELD

The present disclosure relates to providing product information in computer-generated realities.

BACKGROUND

Retail stores display on its shelves various competing products. Shoppers can obtain information about these products. Comparing information about two similar products may require piecing together information from disparate labeling on the respective product packages. Sometimes, more detailed information about the product are not physically available on the product packaging (e.g., ratings or instructions for use).

BRIEF SUMMARY

Reading product packaging and instructions to compare products, while at a brick and mortar shop, is an inefficient experience. Searching online to locate product information, in the same setting, can also be inefficient. These techniques require more time than necessary, wasting user time and device energy. This latter consideration is particularly important in battery-operated devices.

Accordingly, the present techniques provide electronic devices with faster, more efficient methods and interfaces for providing product information. Such methods and interfaces optionally complement or replace other methods for providing product information. Such methods and interfaces reduce the cognitive burden on a user and produce a more efficient human-machine interface. For battery-operated computing devices, such methods and interfaces conserve power and increase the time between battery charges.

In accordance with some embodiments, a method for providing product information is described. The method includes: at an electronic device with a display and one or more image sensors: detecting the appearance of a first product and a second product within a field of view of the one or more image sensors; detecting movement of the first product or the second product relative to one another; in accordance with a determination that the movement of the first product or the second product relative to one another causes the first product to come within a threshold distance of the second product: displaying comparison information at a location at least partially between the first product and the second product; and in accordance with a determination that the movement of the first product or the second product relative to one another does not cause the first product to come within a threshold distance of the second product: forgoing displaying the comparison information.

In accordance with some embodiments, a non-transitory computer-readable storage medium storing one or more programs configured to be executed by one or more processors of an electronic device is described. The one or more programs include instructions for: detecting the appearance of a first product and a second product within a field of view of one or more image sensors; detecting movement of the first product or the second product relative to one another; in accordance with a determination that the movement of the first product or the second product relative to one another causes the first product to come within a threshold distance of the second product: displaying comparison information at a location at least partially between the first product and the second product; and in accordance with a determination that the movement of the first product or the second product relative to one another does not cause the first product to come within a threshold distance of the second product: forgoing displaying the comparison information.

In accordance with some embodiments, a transitory computer-readable storage medium storing one or more programs configured to be executed by one or more processors of an electronic device is described. The one or more programs include instructions for: detecting the appearance of a first product and a second product within a field of view of one or more image sensors; detecting movement of the first product or the second product relative to one another; in accordance with a determination that the movement of the first product or the second product relative to one another causes the first product to come within a threshold distance of the second product: displaying comparison information at a location at least partially between the first product and the second product; and in accordance with a determination that the movement of the first product or the second product relative to one another does not cause the first product to come within a threshold distance of the second product: forgoing displaying the comparison information.

In accordance with some embodiments, an electronic device comprising one or more processors and memory storing one or more programs configured to be executed by the one or more processors is described. The one or more programs include instructions for: detecting the appearance of a first product and a second product within a field of view of one or more image sensors; detecting movement of the first product or the second product relative to one another; in accordance with a determination that the movement of the first product or the second product relative to one another causes the first product to come within a threshold distance of the second product: displaying comparison information at a location at least partially between the first product and the second product; and in accordance with a determination that the movement of the first product or the second product relative to one another does not cause the first product to come within a threshold distance of the second product: forgoing displaying the comparison information.

In accordance with some embodiments, an electronic device is described. The electronic device includes means for detecting the appearance of a first product and a second product within a field of view of one or more image sensors; means for detecting movement of the first product or the second product relative to one another; means for, in accordance with a determination that the movement of the first product or the second product relative to one another causes the first product to come within a threshold distance of the second product: displaying comparison information at a location at least partially between the first product and the second product; and means for, in accordance with a determination that the movement of the first product or the second product relative to one another does not cause the first product to come within a threshold distance of the second product: forgoing displaying the comparison information.

In accordance with some embodiments, a method for providing product information is described. The method includes: at an electronic device with a display and one or more image sensors: identifying a product within a field of view of the one or more image sensors; retrieving a plurality of product characteristics associated with the product; determining a plurality of values based on the plurality of product characteristics and a set of criteria; detecting a request to view product information associated with the product; and in response to detecting the request, displaying product information associated with the product, wherein the product information includes a graphical representation of the plurality of values.

In accordance with some embodiments, a non-transitory computer-readable storage medium storing one or more programs configured to be executed by one or more processors of an electronic device is described. The one or more programs include instructions for: identifying a product within a field of view of one or more image sensors; retrieving a plurality of product characteristics associated with the product; determining a plurality of values based on the plurality of product characteristics and a set of criteria; detecting a request to view product information associated with the product; and in response to detecting the request, displaying product information associated with the product, wherein the product information includes a graphical representation of the plurality of values.

In accordance with some embodiments, a transitory computer-readable storage medium storing one or more programs configured to be executed by one or more processors of an electronic device is described. The one or more programs include instructions for: identifying a product within a field of view of one or more image sensors; retrieving a plurality of product characteristics associated with the product; determining a plurality of values based the plurality of product characteristics and a set of criteria; detecting a request to view product information associated with the product; and in response to detecting the request, displaying product information associated with the product, wherein the product information includes a graphical representation of the plurality of values.

In accordance with some embodiments, an electronic device comprising one or more processors and memory storing one or more programs configured to be executed by the one or more processors is described. The one or more programs include instructions for: identifying a product within a field of view of one or more image sensors; retrieving a plurality of product characteristics associated with the product; determining a plurality of values based on the plurality of product characteristics and a set of criteria; detecting a request to view product information associated with the product; and in response to detecting the request, displaying product information associated with the product, wherein the product information includes a graphical representation of the plurality of values.

In accordance with some embodiments, an electronic device is described. The electronic device includes means for identifying a product within a field of view of one or more image sensors; means for retrieving a plurality of product characteristics associated with the product; means for determining a plurality of values based on the plurality of product characteristics and a set of criteria; means for detecting a request to view product information associated with the product; and means for, in response to detecting the request, displaying product information associated with the product, wherein the product information includes a graphical representation of the plurality of values.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing product information, thereby increasing the effectiveness, efficiency, and user satisfaction with such devices. Such methods and interfaces may complement or replace other methods for providing product information.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
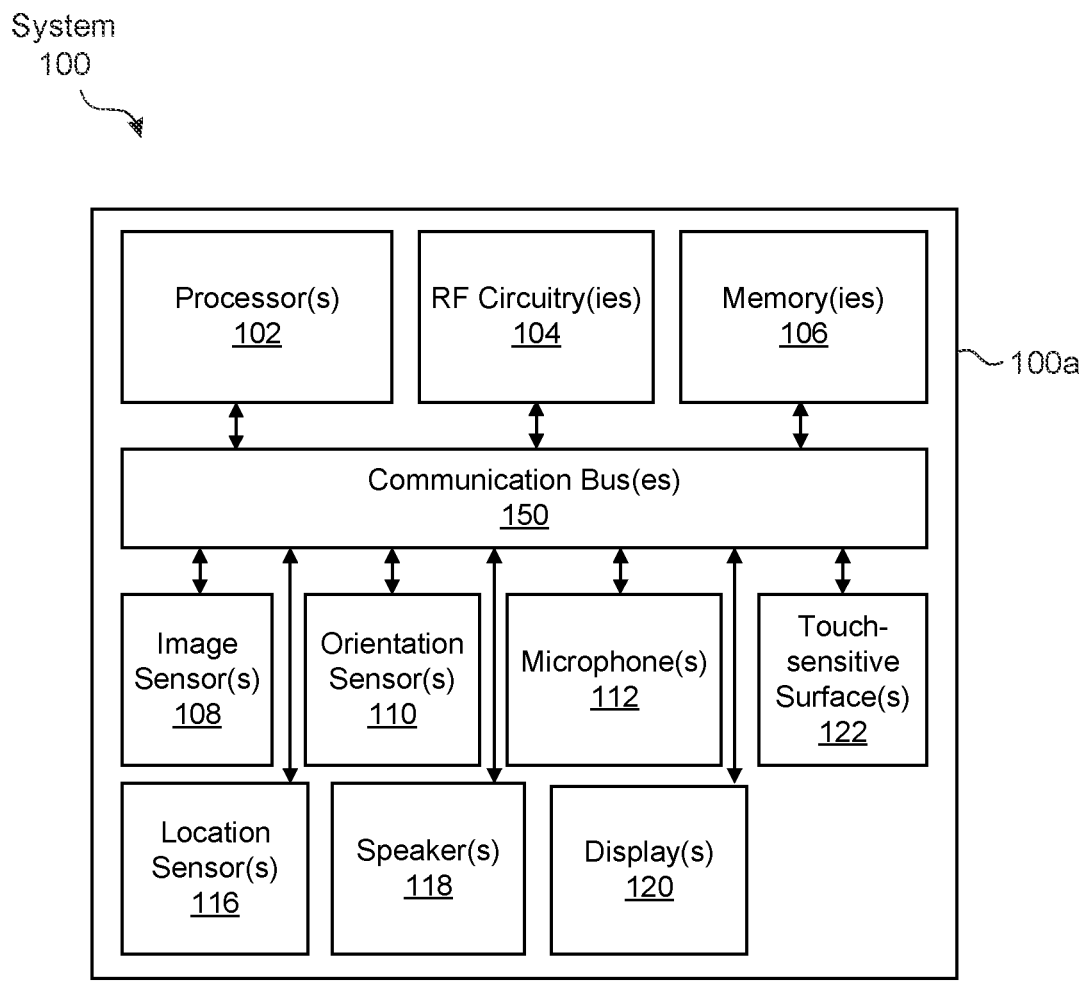
FIGS. 1A and 1B depict exemplary systems for use in various computer-generated reality (CGR) technologies.

Various embodiments of electronic systems and techniques for using such systems in relation to various computer-generated reality technologies, including virtual reality and mixed reality (which incorporates sensory inputs from a physical environment), are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR Include Virtual Reality and Mixed Reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of Mixed Realities Include Augmented Reality and Augmented Virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
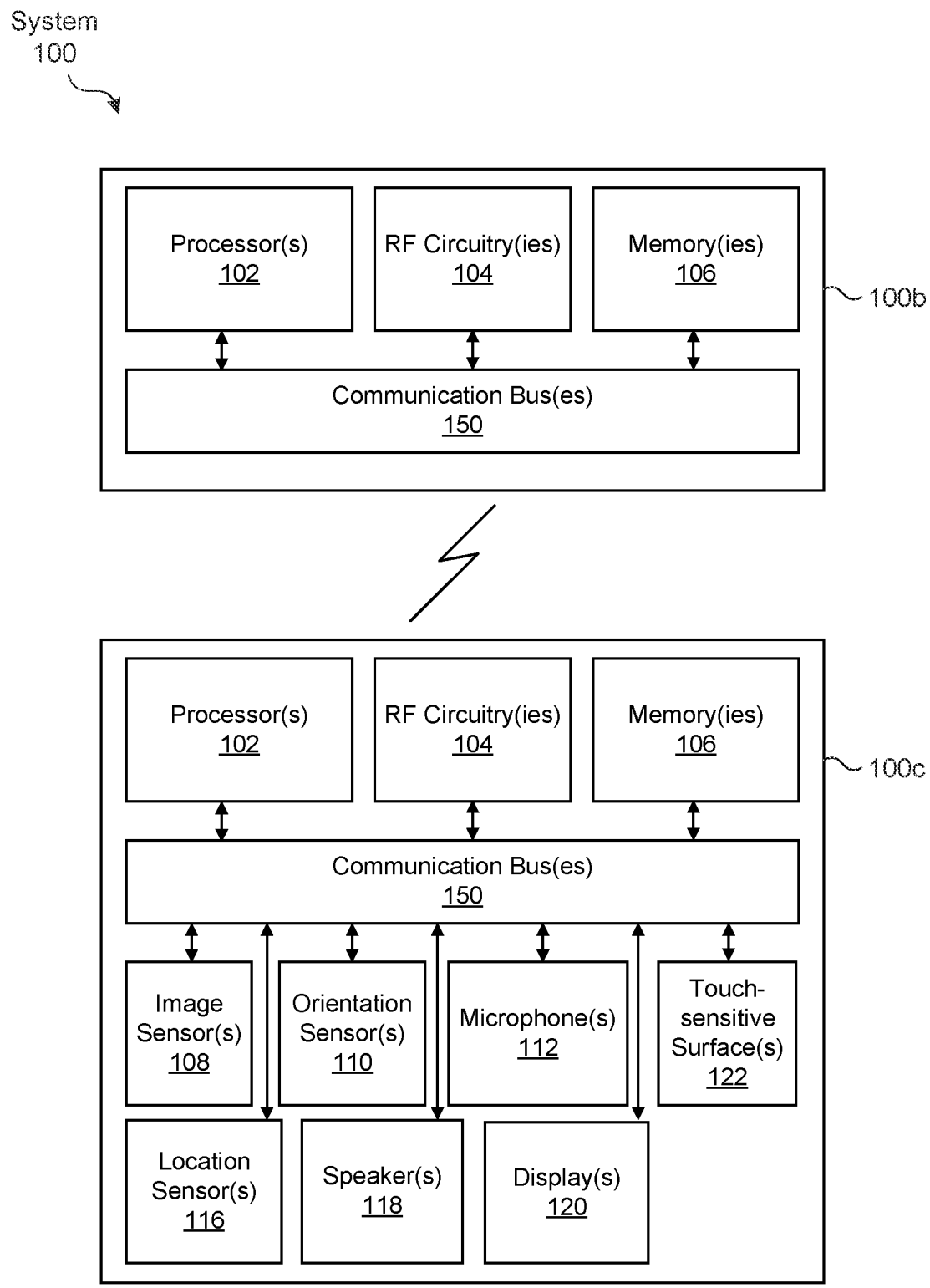

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

Figure 2A:
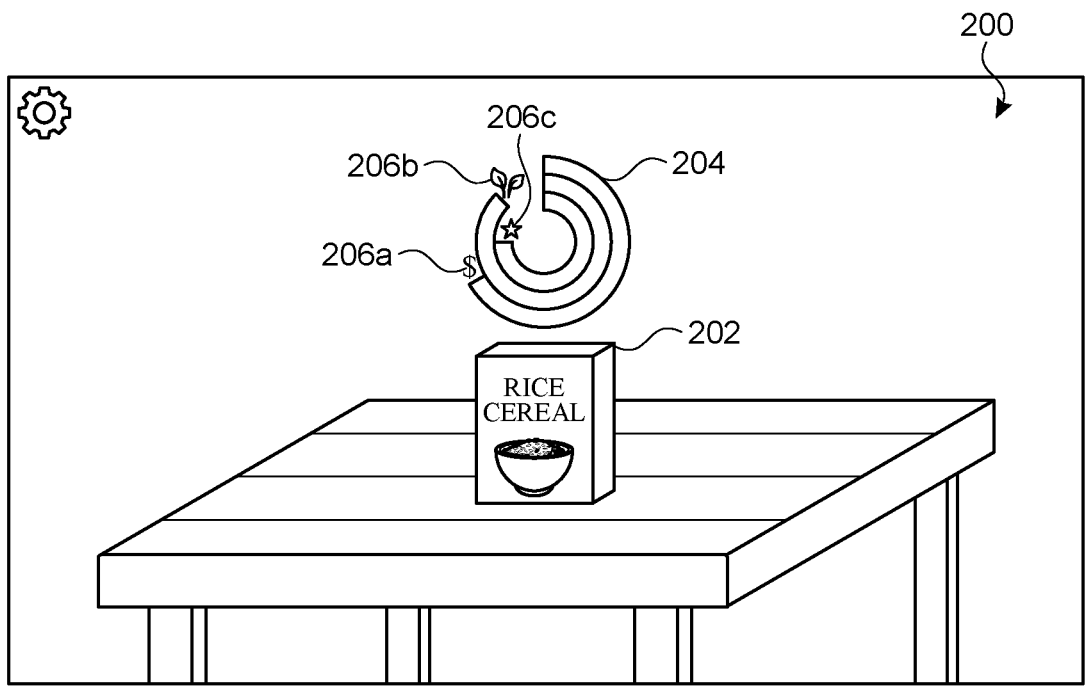
FIG. 2A illustrates an example of a product being viewed in a CGR environment.

FIG. 2A illustrates an example of a product 202 being viewed in a CGR environment 200. As shown in FIG. 2A, when product 202 is viewed in the CGR environment 200, product information 204 is displayed at a location near product 202. In some embodiments, CGR environment 200 is viewed using device 100a of system 100, as described in reference to FIGS. 1A and 1B.

When product 202 is detected within the field of view of device 100a (such as with image sensor(s) 108 described in reference to FIGS. 1A and 1B), system 100 attempts to identify product 202. If product 202 is identified by system 100, then product characteristics for product 202 are retrieved from, for example, a local database or a remote server. The product characteristics include data about product 202, such as retail price, features of the product, ingredients, nutrition information, allergy information, directions for use, drug interaction information, environmental rating (e.g., degree to which the product's packaging or manufacturing impacts the environment), and user rating (e.g., average score given by other users of the product).

After retrieving the product characteristics, a plurality of values are determined based on the product characteristics and a set of criteria. The set of criteria include factors that may aid in a purchasing decision for product 202, such as price, quantity, size, color, calories, ingredients, environmental rating, and user rating. In some embodiments, the set of criteria are defined by a user. In some embodiments, the set of criteria are predefined. The plurality of values represent the degree to which the product characteristics match the set of criteria. For example, if a criterion in the set of criteria is price, then the price of product 202 is compared to a threshold price (e.g., the average price of other similar products, or a user-defined desired price) or a range of prices for the product (e.g., a low price for the product through a high price for the product). If the price of product 202 is below the threshold price, then the value in the plurality of values representing price is high (e.g., the price of product 202 may be a good deal). If the price of product 202 is above the threshold price, then the value in the plurality of values representing price is low (e.g., the price of product 202 may not be a good deal). In some embodiments, the price of the product is analyzed in view of the range of prices for the product (or similar products). In some examples, the device determines the percentile in which the current price falls for product 202 as compared to the range of prices for the product (or similar products).

As another example, if a criterion in the set of criteria is calories, then the calories in a serving of product 202 is compared to a threshold calorie amount (e.g., an average of calories per serving of other similar products, or a user-defined calorie amount for a category of food that includes product 202) or a range of calorie amounts for similar products (e.g., a low calorie amount through a high calorie amount for similar products). If the calories in a serving of product 202 is below the threshold calorie amount, then the value in the plurality of values representing calories is high (e.g., product 202 may be a healthy food). If the calories in a serving of product 202 is above the threshold calories amount, then the value in the plurality of values representing calories is low (e.g., product 202 may not be a healthy food). In some embodiments, the calorie amount of the product is analyzed in view of the range of calorie amounts for similar products. In some examples, the device determines the percentile in which the calorie amount falls for product 202 as compared to a range of calorie amounts for similar products.

As another example, if a criterion in the set of criteria is user rating, then the user rating of product 202 is assigned to a value in the plurality of values representing user rating. If the user rating of product 202 is low, then the value in the plurality of values representing user rating is also low. If the user rating of product 202 is high, then the value in the plurality of values representing user rating is also high. Alternatively, when a criterion in the set of criteria is user rating, then the user rating of product 202 is compared to a threshold user rating (e.g., an average of user ratings for other similar products, or a user-defined minimum rating). If the user rating of product 202 is below the threshold user rating, then the value in the plurality of values representing user rating is low (e.g., product 202 is below the user-defined minimum rating). If the user rating of product 202 is above the threshold user rating, then the value in the plurality of values representing user rating is high (e.g., product 202 is above the user-defined minimum rating).

Once the plurality of values are determined, a graphical representation of the plurality values is displayed as product information 204. In the example shown in FIG. 2A, product information includes a graphical representation of three values. A first value representing price is graphically represented by first ring 206a. The length of first ring 206a corresponds to the first value representing price (e.g., a short first ring 206a indicates the price of product 202 is high compared to a threshold price, while a long first ring 206a indicates the price of product 202 is low compared to the threshold price). In some embodiments, ring 206a corresponds to the percentile of the price of product 202 as compared to the range of prices for the product (or similar products). For example, when the price of product 202 is at the 70th percentile between the low and high of the range of prices, ring 206a is filled in 70% of the way to indicate that the price is a relatively good price. In some examples, ring 206a being 100% filled indicates the price of product 202 is the same or less than the range of prices, 50% filled indicates the price of product 202 is the same as the average of the range of prices.

A second value representing environmental rating is graphically represented by second ring 206b. The length of second ring 206b corresponds to the second value representing environmental rating (e.g., a short second ring 206b indicates a low environmental rating, while a long second ring 206b indicates a high environmental rating). In some embodiments, ring 206b corresponds to the percentile of the environment rating of product 202 as compared to the range of environmental ratings for similar products. For example, when the environmental rating of product 202 is at the 70th percentile between the low and high of the range of environment ratings, ring 206b is filled in 70% of the way to indicate that the price is a relatively environmentally friendly compared to similar products.

A third value representing user rating is graphically represented by third ring 206c. The length of third ring 206c corresponds to the third value representing user rating (e.g., a short third ring 206c indicates a low user rating, while a long third ring 206c indicates a high environmental rating). As described with respect to the second ring 206b, the third ring 206c illustrates a value as compared to a range.

While shown as rings in FIG. 2A, it should be understood that product information 204 can include other graphical representations of the plurality of values, such as a bar chart, a radar chart, star ratings, numerical values, etc.

In some embodiments, product information 204 is displayed in response to product 202 being less than a first threshold distance from device 100a. For example, if product 202 is detected in the field of view of device 100a at a distance greater than the first threshold distance, then product information 204 is not displayed. Once the device determines that the distance to product 202 is less than the first threshold distance, then product information 204 is displayed, as shown in FIG. 2A. In some embodiments, product information 204 is displayed at a position relative to product 202 in the CGR environment 200. As device 100a or product 202 moves relative to each other, the position of product information 204 relative to product 202 remains constant (e.g., product information 204 continues to appear above product 202 in the CGR environment 200 as product 202 is moved by a user).

In some embodiments, product information 204 is displayed in response to detecting movement of product 202 relative to device 100a (e.g., relative to image sensor(s) 108 of device 100a). For example, when a user picks up product 202, the motion of product 202 relative to device 100a is detected. In response to this motion, product information 204 is displayed.

In some embodiments, product information 204 is displayed in response to detecting a gesture associated with product 202. For example, when a user moves product 202 in a specific manner, product information 204 is displayed. The specific manner of movement of product 202 optionally includes one or more of: an upward movement, a movement toward the user's head, a movement toward a sensor (e.g., visual sensor) of the electronic device, or any other movement to indicate user interest in product 202.

Figure 2B:
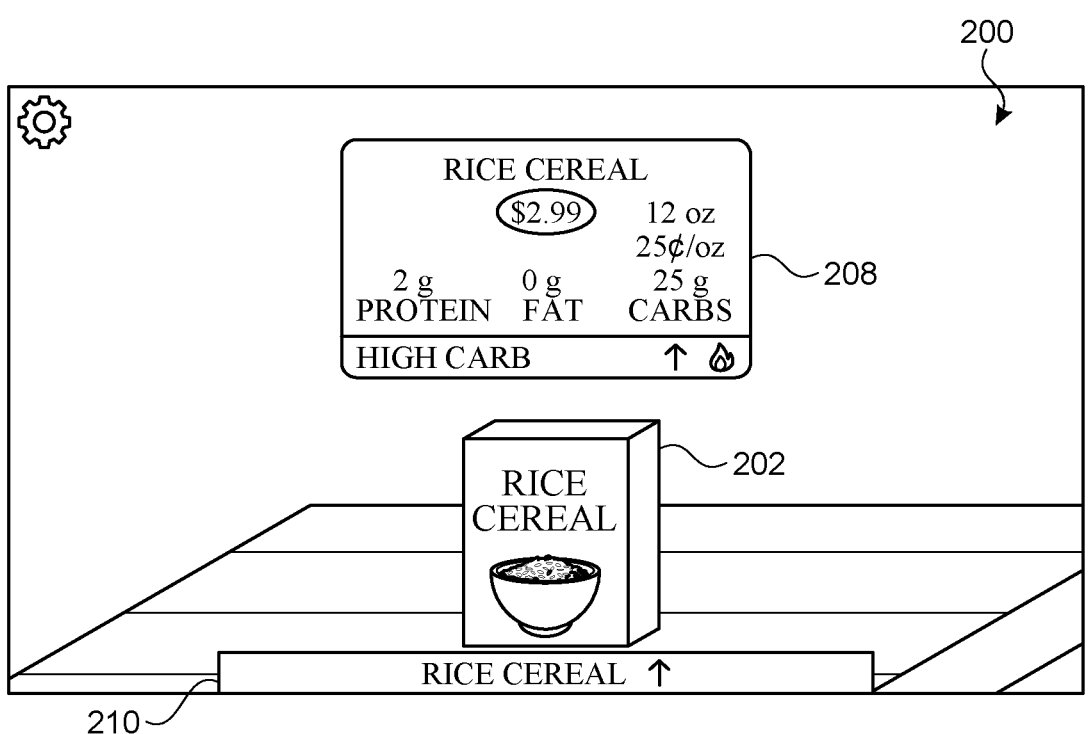
FIG. 2B illustrates an example of detailed information for a product being viewed in a CGR environment.

In some embodiments, after displaying product information 204, additional detailed information about product 202 is displayed. FIG. 2B illustrates an example of detailed information 208 for product 202 being viewed in CGR environment 200. Detailed information 208 includes one or more specific product characteristics retrieved for product 202, such as retail price, features of the product, ingredients, nutrition information, allergy information, directions for use, drug interaction information, environmental rating, and user rating. In some examples, as illustrated in FIGS. 2A and 2B, display of detailed information 208 replaces display of product information 204. In some embodiments, device 100a displays detailed information 208 while maintaining (in addition to) display of product information 204.

In some embodiments, detailed information 208 is displayed in response to detecting that a distance between product 202 and device 100a is less than a second threshold distance (e.g., product 202 is closer to image sensor(s) 108 of device 100a in FIG. 2B than in FIG. 2A). For example, if product 202 is detected in the field of view of device 100a at a distance greater than the second threshold distance but less than the first threshold distance, then product information 204 is displayed as shown in FIG. 2A. If the distance to product 202 is reduced to less than the second threshold distance, then detailed information 208 is displayed, as shown in FIG. 2B. In some embodiments, detailed information 208 is displayed at a position relative to product 202 in the CGR environment 200. As device 100a or product 202 moves relative to each other, the position of detailed information 208 relative to product 202 remains constant (e.g., detailed information 208 continues to appear above product 202 in the CGR environment 200 as product 202 is moved by a user).

In some embodiments, detailed information 208 is displayed in response to detecting movement of product 202 relative to device 100a (e.g., relative to image sensor(s) 108 of device 100a). For example, when a user picks up product 202, the motion of product 202 relative to device 100a is detected. In response to this motion, detailed information 208 is displayed.

In some embodiments, detailed information 208 is displayed in response to detecting a gesture associated with product 202. For example, when a user moves product 202 in a specific manner, detailed information 208 is displayed.

The specific manner of movement of product 202 includes an upward movement, a movement toward the user's head, or any other movement to indicate the user is interested in viewing detailed information about product 202.

In some embodiments, further information about product 202 is displayed in response to detecting an input requesting the further information. In some embodiments, the input requesting the further information is a tap or swipe gesture at a location where pull-up menu 210 is displayed in CGR environment 200. In some embodiments, the input requesting the further information is a tap or swipe gesture at a location where detailed information 208 is displayed in CGR environment 200. In some embodiments, the input requesting the further information is a tap or swipe gesture at a location of product 202 in CGR environment 200.

Figure 2C:
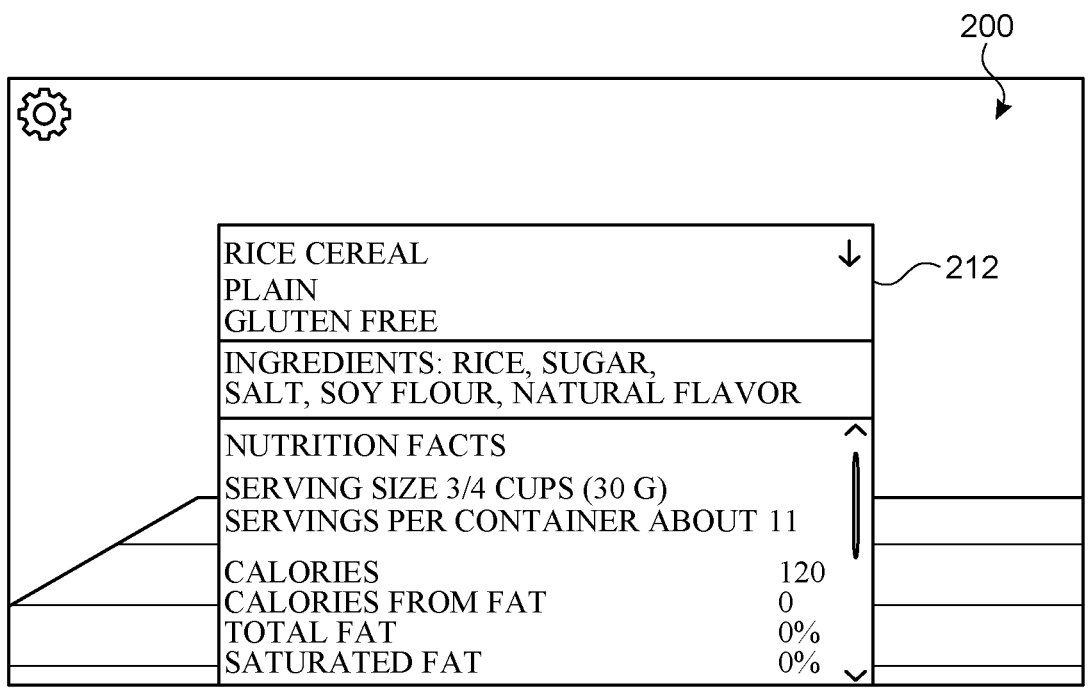
FIG. 2C illustrates an example of further information for a product being viewed in a CGR environment.

FIG. 2C illustrates an example of further information 212 for product 202 being viewed in CGR environment 200. Further information 212 includes additional information about product 202 not included in detailed information 208, such as retail price, features of the product, ingredients, nutrition information, allergy information, directions for use, drug interaction information, environmental rating, and user rating. Further information 212 is displayed in response to detecting an input requesting the further information, as described in reference to FIG. 2B.

Figure 2D:
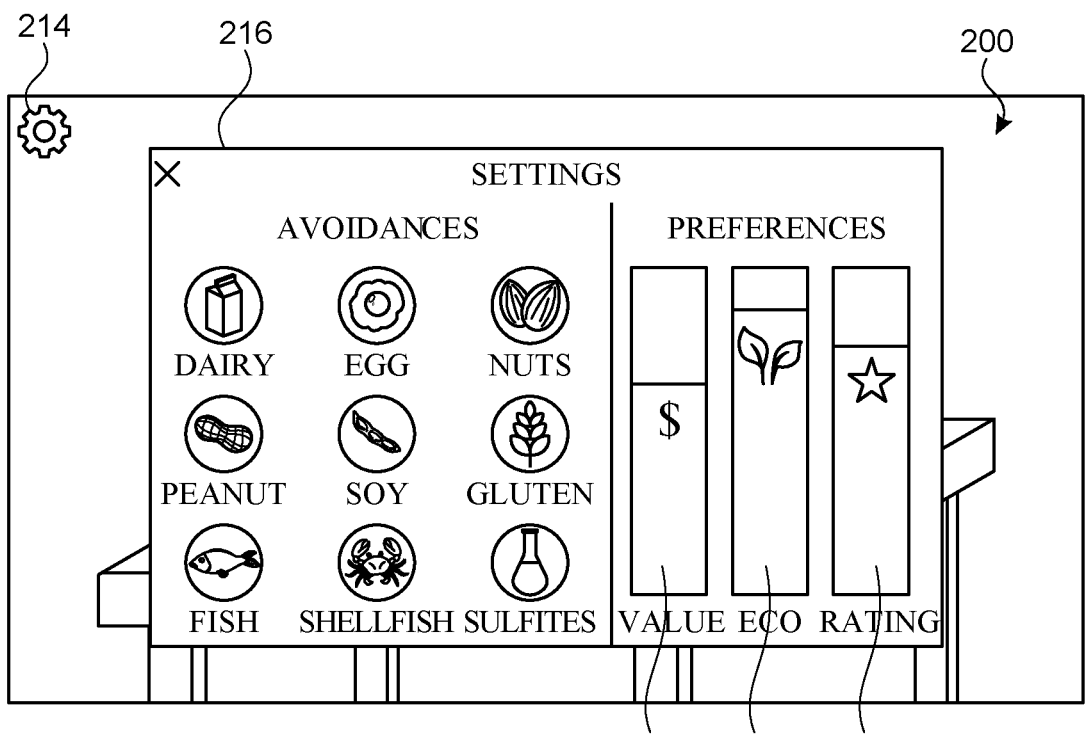
FIG. 2D illustrates an example of a settings interface being viewed in a CGR environment.

FIG. 2D illustrates an example of a settings interface 216 being viewed in CGR environment 200. In some embodiments, settings interface 216 is displayed in response to detecting an input at a location of settings affordance 214 in CGR environment 200. Settings interface 216 includes criteria options 218a-218c for the set of criteria used in determining the plurality of values for the product information 204, as shown in FIG. 2A. For example, as shown in FIG. 2D, criteria option 218a corresponds to a price criterion (e.g., "VALUE"), criteria option 218b corresponds to an environmental rating criterion (e.g., "ECO"), and criteria option 218c corresponds to a user rating criterion (e.g., "RATING"). In some embodiments, different or additional criteria options are selected to change the set of criteria for the product information 204. For example, criteria option 218a can be changed from the price criterion to a different criterion, such as size, color, calories, or ingredients.

Figure 2E:
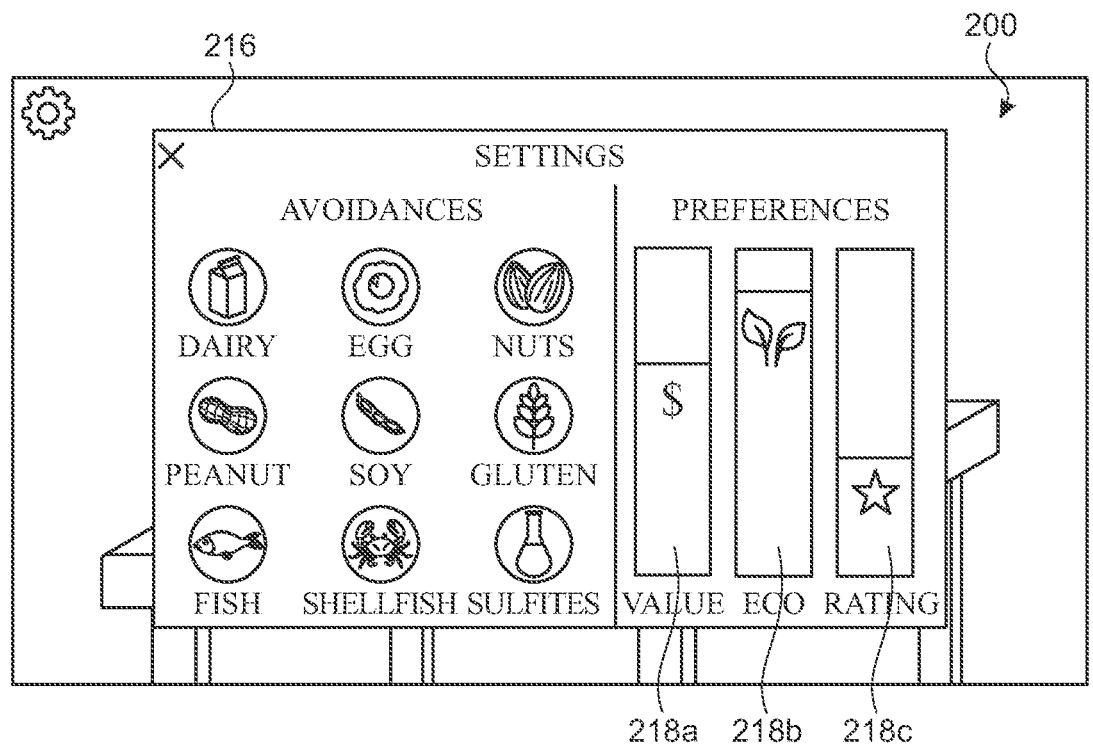
FIG. 2E illustrates an example of a value associated with a criteria option being changed.
Figure 2F:
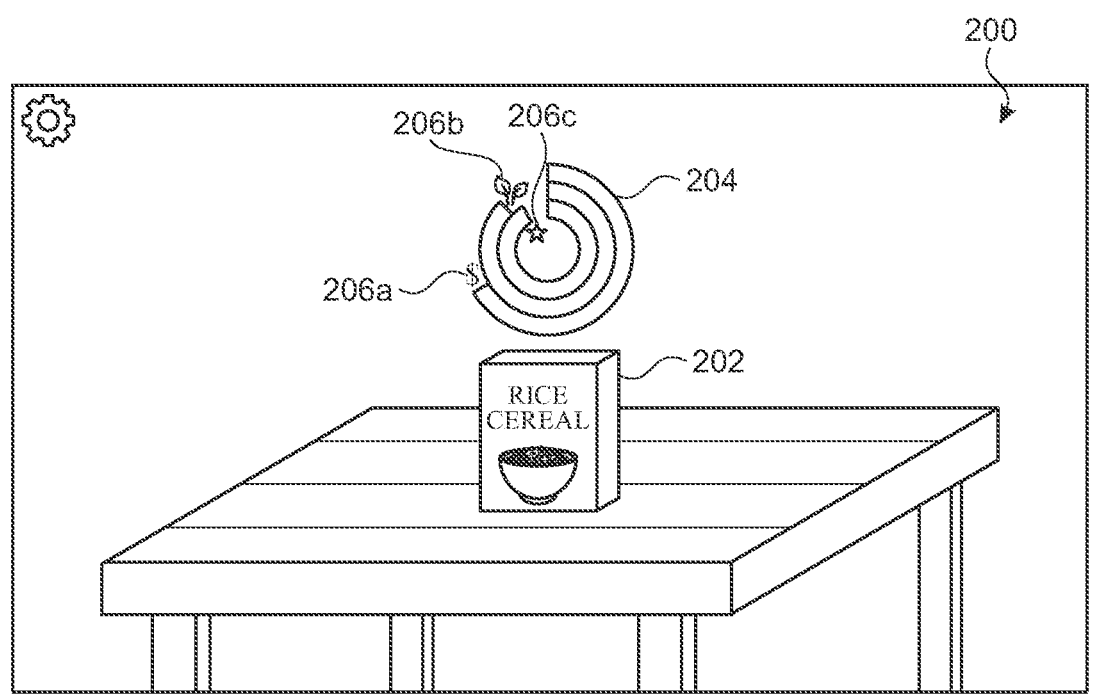
FIG. 2F illustrates an example of displayed product information being changed in response to a change in a criteria option.

In some embodiments, values associated with criteria options 218a-218c are changed. Changing the values associated with criteria options 218a-218c results in the values for the product information 204 also being changed. FIG. 2E illustrates an example of the value associated with criteria option 218c being reduced. Reducing the value of criteria option 218c results in the user-defined minimum rating being reduced. As a result, the value graphically represented by third ring 206c of product information 204 is increased, as shown in FIG. 2F (e.g., the user rating of product 202 is now higher relative to the changed user-defined minimum rating).

Figure 2G:
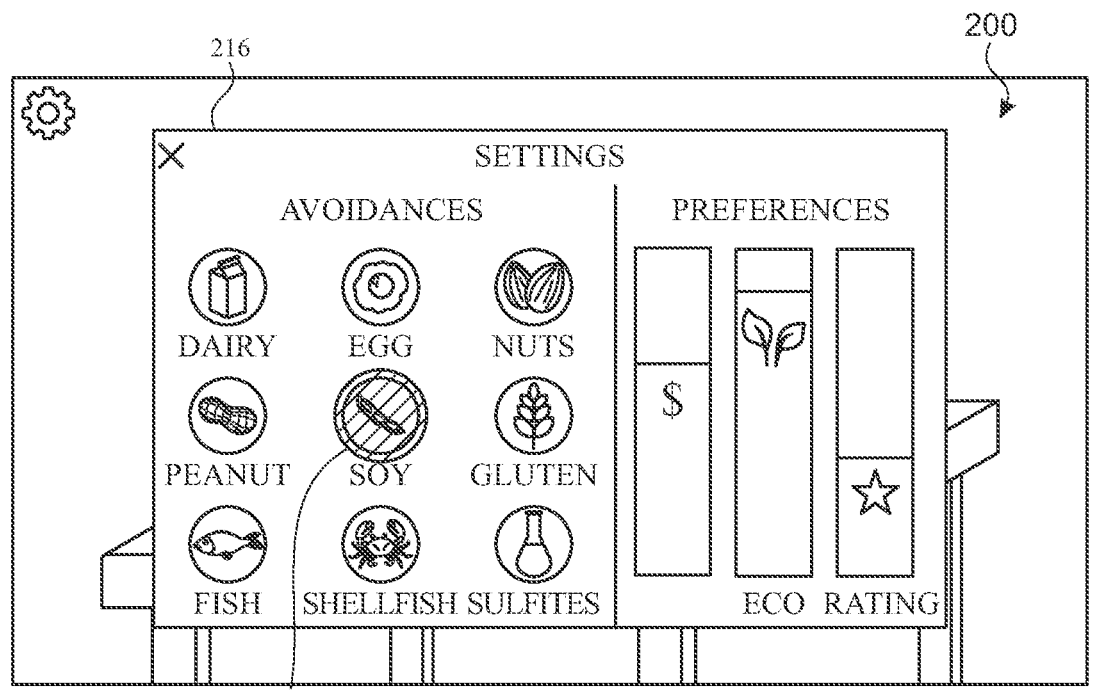
FIG. 2G illustrates an example of an avoidance option being selected.

In some embodiments, settings interface 216 further includes one or more avoidance options. Avoidance options correspond to features or ingredients of a product that a user prefers to avoid, such as ingredients that the user has allergies or intolerances to. FIG. 2G illustrates an example of avoidance option 220 ("SOY") being selected. In some embodiments, avoidance option 220 is selected in response to detecting an input at the location of avoidance option 220 in CGR environment 200. In some embodiments, avoidance option 220 is pre-selected in response to known allergy information for a user of device 100a.

Figure 2H:
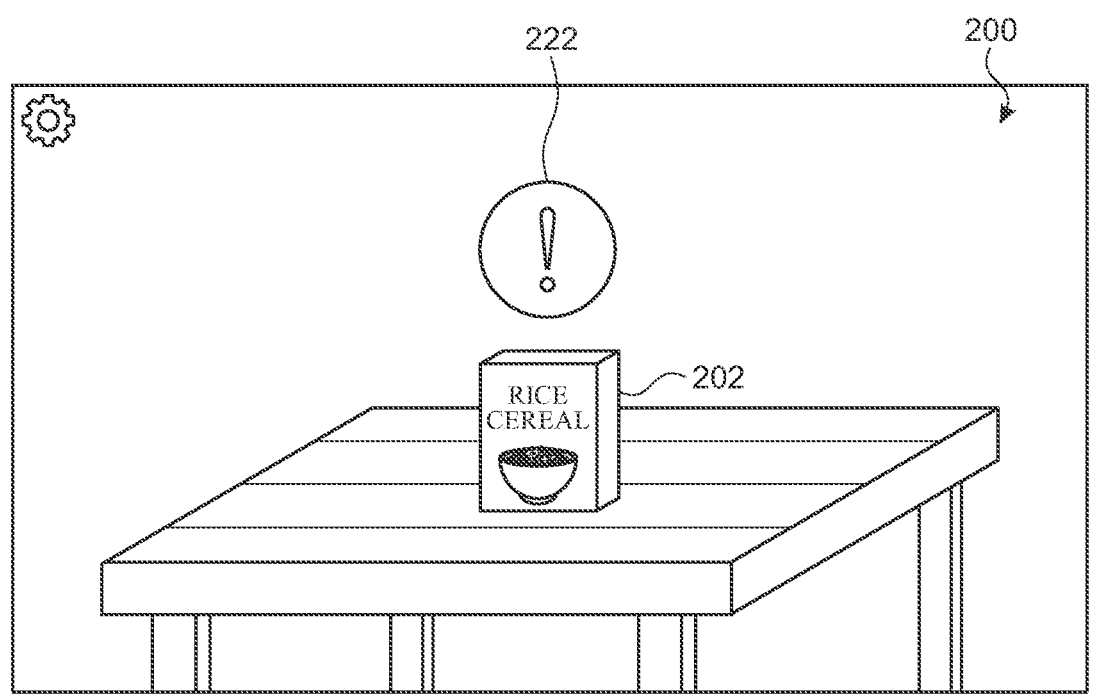
FIG. 2H illustrates an example of a general warning being displayed in a CGR environment.

When a product including the feature or ingredient corresponding to the selected avoidance option 220 is viewed in CGR environment 200, a warning is displayed. FIG. 2H illustrates an example of a general warning 222 being displayed in CGR environment 200. General warning 222 indicates that product 202 includes a feature or ingredient selected in the avoidance options. In some embodiments, general warning 222 is displayed at a position relative to product 202 in the CGR environment 200. As device 100a or product 202 moves, the position of general warning 222 relative to product 202 remains constant (e.g., general warning 222 continues to appear above product 202 in the CGR environment 200 as product 202 is moved by a user).

Figure 2I:
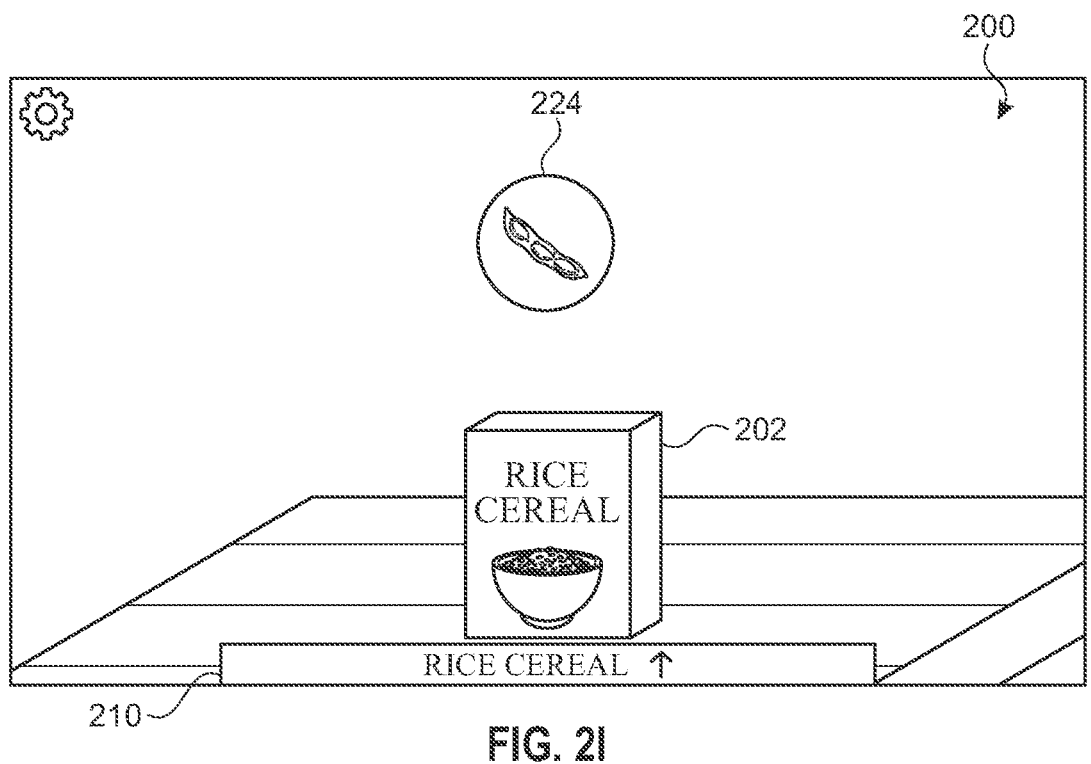
FIG. 2I illustrates an example of a detailed warning being displayed in a CGR environment.

In some embodiments, a detailed warning is displayed in response to product 202 being less than a third threshold distance from device 100a. FIG. 2I illustrates an example of a detailed warning 224 being displayed in CGR environment 200 (e.g., product 202 is closer to image sensor(s) 108 of device 100a in FIG. 2I than in FIG. 2H). For example, if product 202 is detected in the field of view of device 100a at a distance greater than the third threshold distance, then general warning 222 is displayed as shown in FIG. 2H. If the distance to product 204 is reduced to less than the third threshold distance, then detailed warning 224 is displayed, as shown in FIG. 2I. In some embodiments, detailed warning 224 is displayed at a position relative to product 202 in the CGR environment 200. As device 100a or product 202 moves, the position of detailed warning 224 relative to product 202 remains constant (e.g., detailed warning 224 continues to appear above product 202 in the CGR environment 200 as product 202 is moved by a user).

Figure 3:
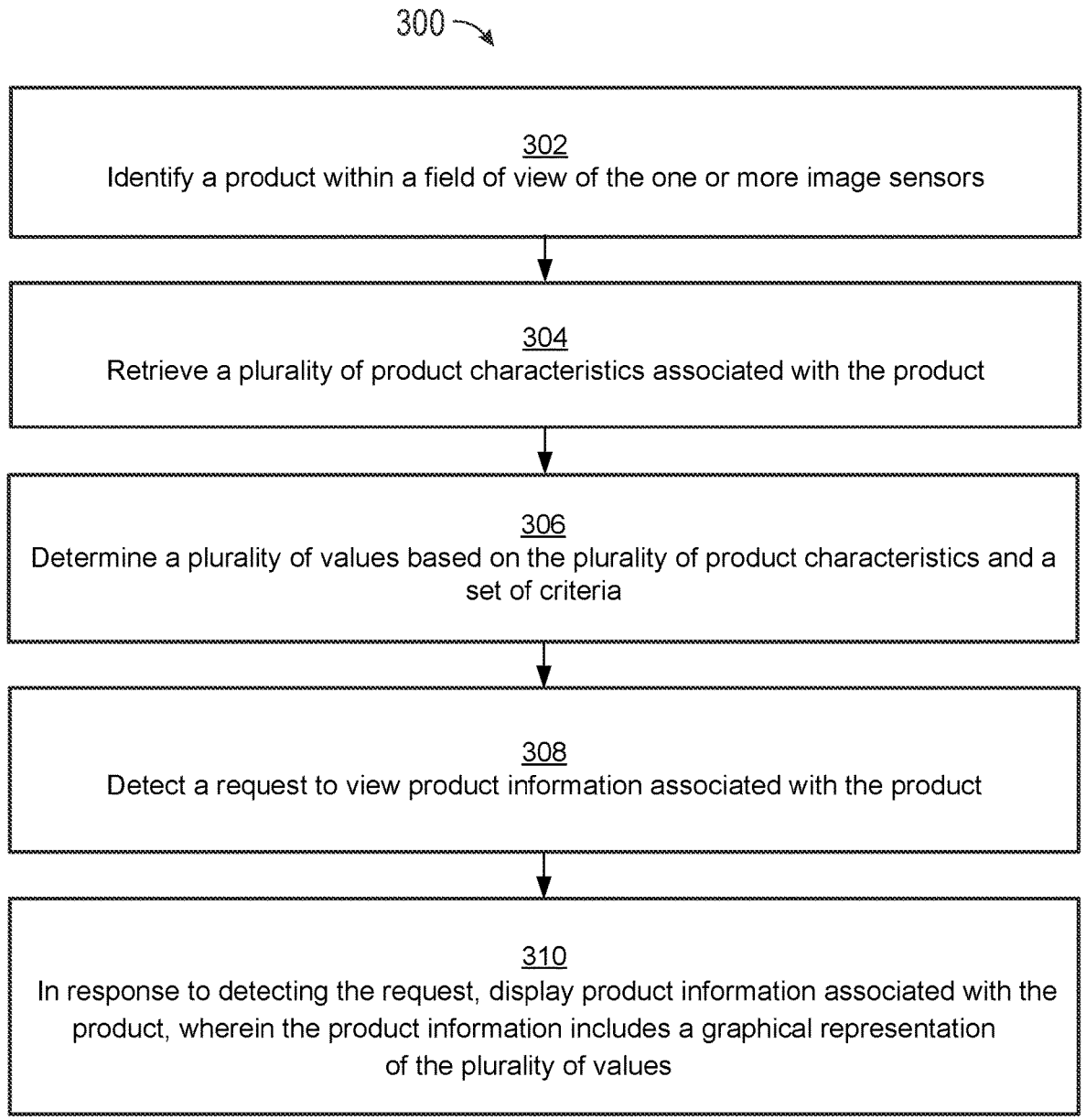
FIG. 3 is a flow diagram illustrating a method for providing product information using an electronic device in accordance with some embodiments.

FIG. 3 is a flow diagram illustrating a method for providing product information using an electronic device in accordance with some embodiments. Method 300 is performed at a device (e.g., 100a) with a display (e.g., 120) and one or more image sensors (e.g., 108). Some operations in method 300 are, optionally, combined, the orders of some operations are, optionally, changed, and some operations are, optionally, omitted.

As described below, method 300 provides an intuitive way for providing product information. The method reduces the cognitive burden on a user for locating product information, thereby creating a more efficient human-machine interface. For battery-operated computing devices, enabling a user to view product information faster and more efficiently conserves power and increases the time between battery charges.

At block 302, a product (e.g., 202) within a field of view of one or more image sensors (e.g., 108) is identified.

At block 304, a plurality of product characteristics associated with the product are retrieved. In some embodiments, the plurality of product characteristics includes one or more of price, quantity, size, features, ingredients, nutrition information, allergy information, directions for use, drug interaction information, environmental rating, and user rating.

At block 306, a plurality of values are determined based on the plurality of product characteristics and a set of criteria. In some embodiments, the set of criteria includes one or more of price, size, color, calories, ingredients, environmental rating, and user rating.

At block 308, a request to view product information (e.g., 204) associated with the product (e.g., 202) is detected. In some embodiments, detecting the request to view product information (e.g., 204) includes detecting a distance between the product (e.g., 202) and the one or more image sensors (e.g., 108) is less than a first threshold distance. In some embodiments, detecting the request to view product information (e.g., 204) includes detecting movement of the product (e.g., 202) relative to the one or more image sensors (e.g., 108). In some embodiments, detecting the request to view product information (e.g., 204) includes detecting a gesture associated with the product (e.g., a specific movement of product 202).

At block 310, in response to detecting the request, product information (e.g., 204) associated with the product (e.g., 202) is displayed (e.g., in CGR environment 200). The product information (e.g., 204) includes a graphical representation of the plurality of values. In some embodiments, the product information (e.g., 204) is displayed at a position relative to the product (e.g., product information 204 is displayed above product 202). In some embodiments, the relative position of the product information (e.g., 204) is maintained during movement of the product (e.g., product information 204 continues to be displayed above product 202 while product 202 moves).

In some embodiments, after displaying the product information (e.g., 204), a request to view detailed information (e.g., 208) is detected. In response to detecting the request to view detailed information (e.g., 208), one or more of the plurality of product characteristics are displayed. In some embodiments, detecting the request to view detailed information (e.g., 208) includes detecting a distance between the product (e.g., 202) and the one or more image sensors (e.g., 108) is less than a second threshold distance. In some embodiments, detecting the request to view detailed information (e.g., 208) includes detecting movement of the product (e.g., 202) relative to the one or more image sensors (e.g., 108). In some embodiments, detecting the request to view detailed information (e.g., 208) includes detecting a second gesture associated with the product (e.g., a specific movement of product 202 or input in the CGR environment).

Note that details of the processes described above with respect to method 300 (e.g., FIG. 3 are also applicable in an analogous manner to the methods described below. For example, method 500 optionally includes one or more of the characteristics of the various methods described above with reference to method 300. For example, product information or detailed information can be displayed in method 500 using one or more of the techniques described in method 300. For brevity, these details are not repeated below.

Figure 4A:
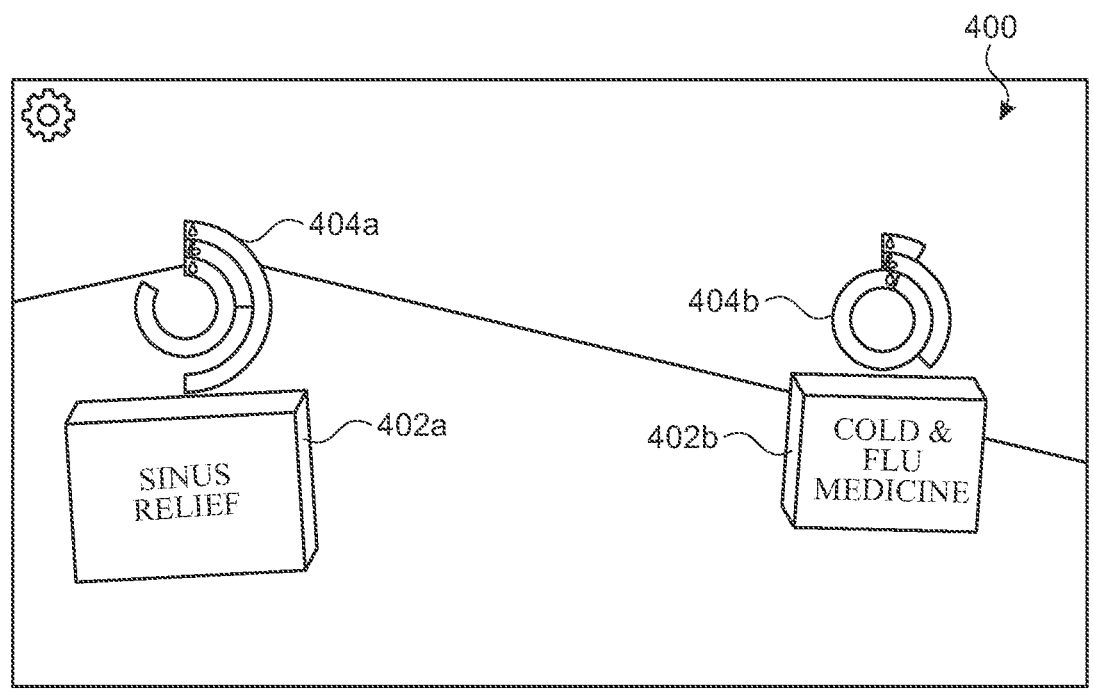
FIG. 4A illustrates an example of two products being viewed in a CGR environment.

FIG. 4A illustrates an example of two products 402a and 402b being viewed in a CGR environment 400. As shown in FIG. 4A, when products 402a and 402b are viewed in the CGR environment 400, product information 404a is displayed at a location near product 402a and product information 404b is displayed at a location near product 402b. In some embodiments, CGR environment 400 is viewed using device 100a of system 100, as described in reference to FIGS. 1A and 1B.

When products 402a and 402b are detected within the field of view of device 100a (such as with image sensor(s) 108 described in reference to FIGS. 1A and 1B), system 100 attempts to identify products 402a and 402b. If products 402a and 402b are identified by system 100, then product information 404a and 404b are displayed. In some embodiments, product information 404a and 404b are displayed using one or more of the techniques described in reference to FIGS. 2A-2I.

In some embodiments, product information 404a and 404b are displayed in response to products 402a and 402b being less than a first threshold distance from device 100a. For example, if product 402a is detected in the field of view of device 100a at a distance greater than the first threshold distance, then product information 404a is not displayed. Once the distance to product 402a is less than the first threshold distance, then product information 404a is displayed, as shown in FIG. 4A. A similar technique applies to product information 404b. In some embodiments, product information 404a is displayed at a position relative to product 402a in the CGR environment 400, and product information 404b is displayed at a position relative to product 402b in the CGR environment 400. As device 100a or either product 402a or 402b moves, the position of product information 404a and 404b relative to products 402a and 402b remains constant (e.g., product information 402a continues to appear above product 402a in the CGR environment 400 as product 402a is moved by a user).

In some embodiments, product information 404a is displayed in response to detecting movement of product 402a relative to device 100a (e.g., relative to image sensor(s) 108 of device 100a). For example, when a user picks up product 402a, the motion of product 402a relative to device 100a is detected. In response to this motion, product information 404a is displayed. Similarly, in some embodiments, product information 404b is displayed in response to detecting movement of product 402b relative to device 100a (e.g., relative to image sensor(s) 108 of device 100a).

In some embodiments, product information 404a is displayed in response to detecting a gesture associated with product 402a. For example, when device 100a detects that a user moves product 402a in a specific manner, product information 404a is displayed. The specific manner of movement of product 402a includes an upward movement, a movement toward the user's head, or any other movement to indicate user interest in product 402a. Similar, in some embodiments, product information 404b is displayed in response to detecting a gesture associated with product 402b.

Figure 4B:
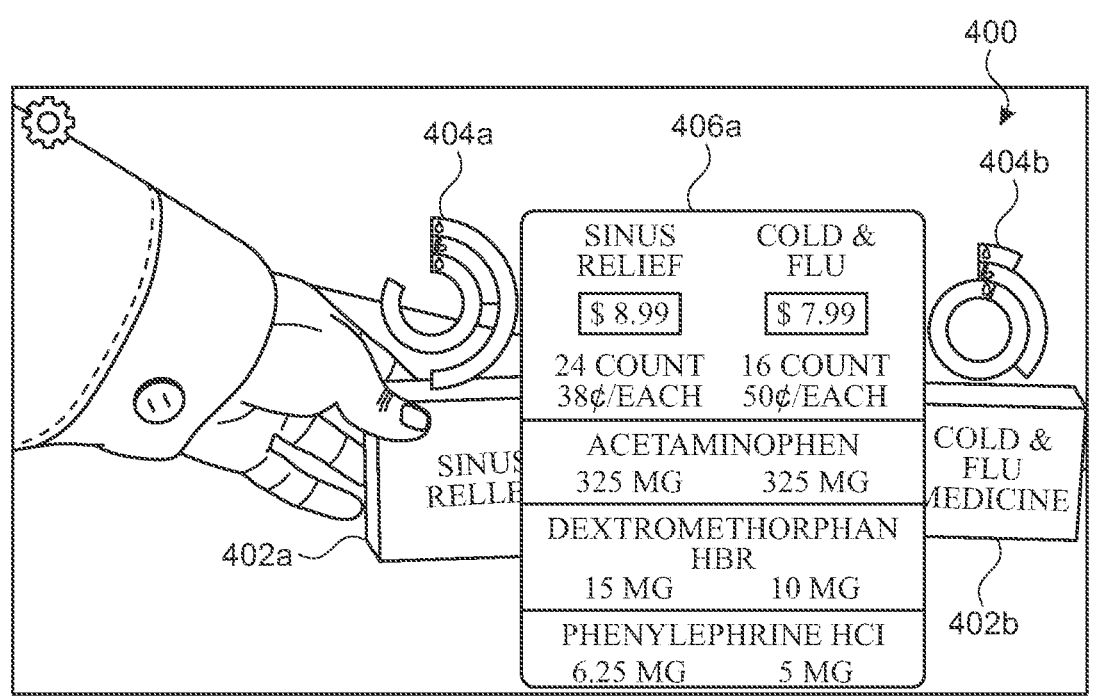
FIG. 4B illustrates an example of a first product being within a threshold distance of a second product.

When a movement of product 402a relative to product 402b is detected, a determination is made as to whether the movement causes product 402a to come within a threshold distance of product 402b. FIG. 4B illustrates an example of product 402a being within the threshold distance of product 402b. When product 402a is within the threshold distance of product 402b, comparison information 406a is displayed in CGR environment 400 at a location at least partially between products 402a and 402b. If product 402a is not moved within the threshold distance of product 402b, then display of comparison information 406a is forgone. As shown in FIG. 4B, comparison information 406a includes information regarding the prices and ingredients of products 402a and 402b. By displaying the prices and ingredients of products 402a and 402b at the same time, the products can be more easily compared. In some embodiments, comparison information 406a includes one or more of price, features, ingredients, nutrition information, allergy information, directions for use, drug interaction information, environmental rating, and user rating.

In some embodiments, comparison information 406a is displayed during movement of the product 402a or 402b. For example, as soon as device 100a determines that product 402a is within the threshold distance from product 402b, comparison information 406a is displayed. Comparison information 406a continues to be displayed while device 100a detects product 402a moving relative to product 402b, as long as device 100a continues to determine that product 402a is within the threshold distance from product 402b. In some embodiments, while device 100a detects product 402a moving relative to product 402b within the threshold distance, display of comparison information 406a is maintained at a location at least partially between the first product and the second product (e.g., comparison information 406a is kept centered between products 402a and 402b while the products move relative to each other). In some embodiments, display of product information 404a and 404b is maintained while comparison information 406a is displayed. When device 100a determines that product 402a is no longer within the threshold distance of product 402b (e.g., product 402a is moved away from product 402b), then comparison information 406a ceases to be displayed.

Figure 4C:
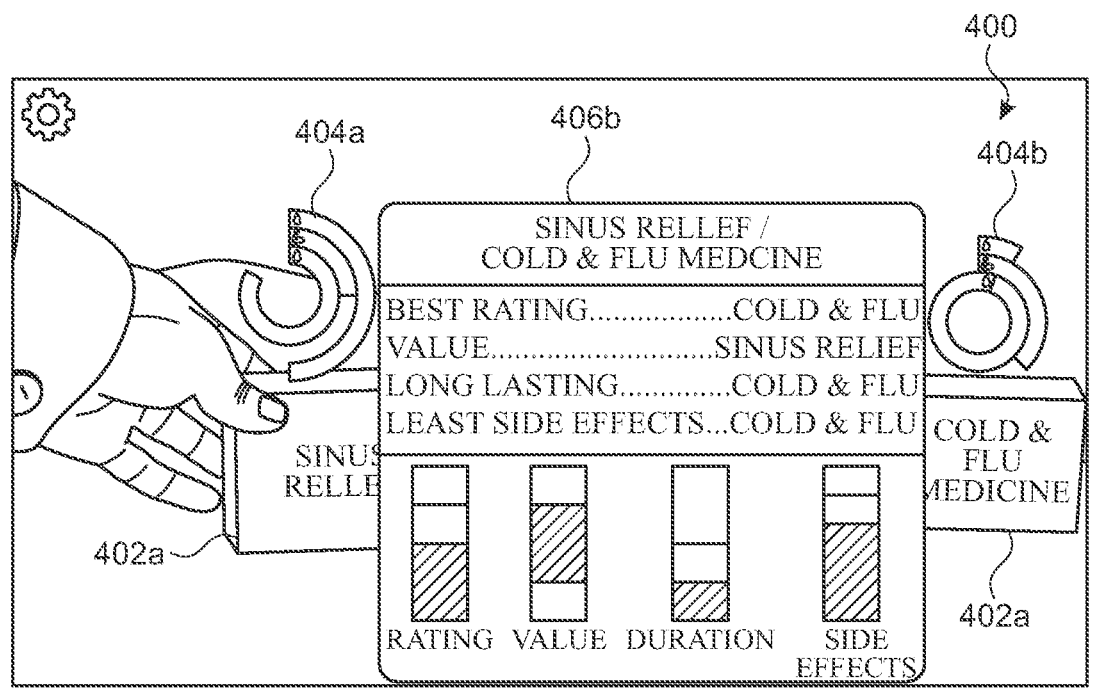
FIG. 4C illustrates another example of a first product being within a threshold distance of a second product.

FIG. 4C illustrates another example of product 402a being within the threshold distance of product 402b. As shown in FIG. 4C, comparison information 406b includes ratings and recommendation information for products 402a and 402b. In some embodiments the ratings and recommendation information are based on user-defined preferences. By displaying ratings and recommendation information for products 402a and 402b, a preferred product can be more easily chosen by a user. In some embodiments, comparison information 406b includes one or more of price, features, ingredients, nutrition information, allergy information, directions for use, drug interaction information, environmental rating, and user rating.

Figure 4D:
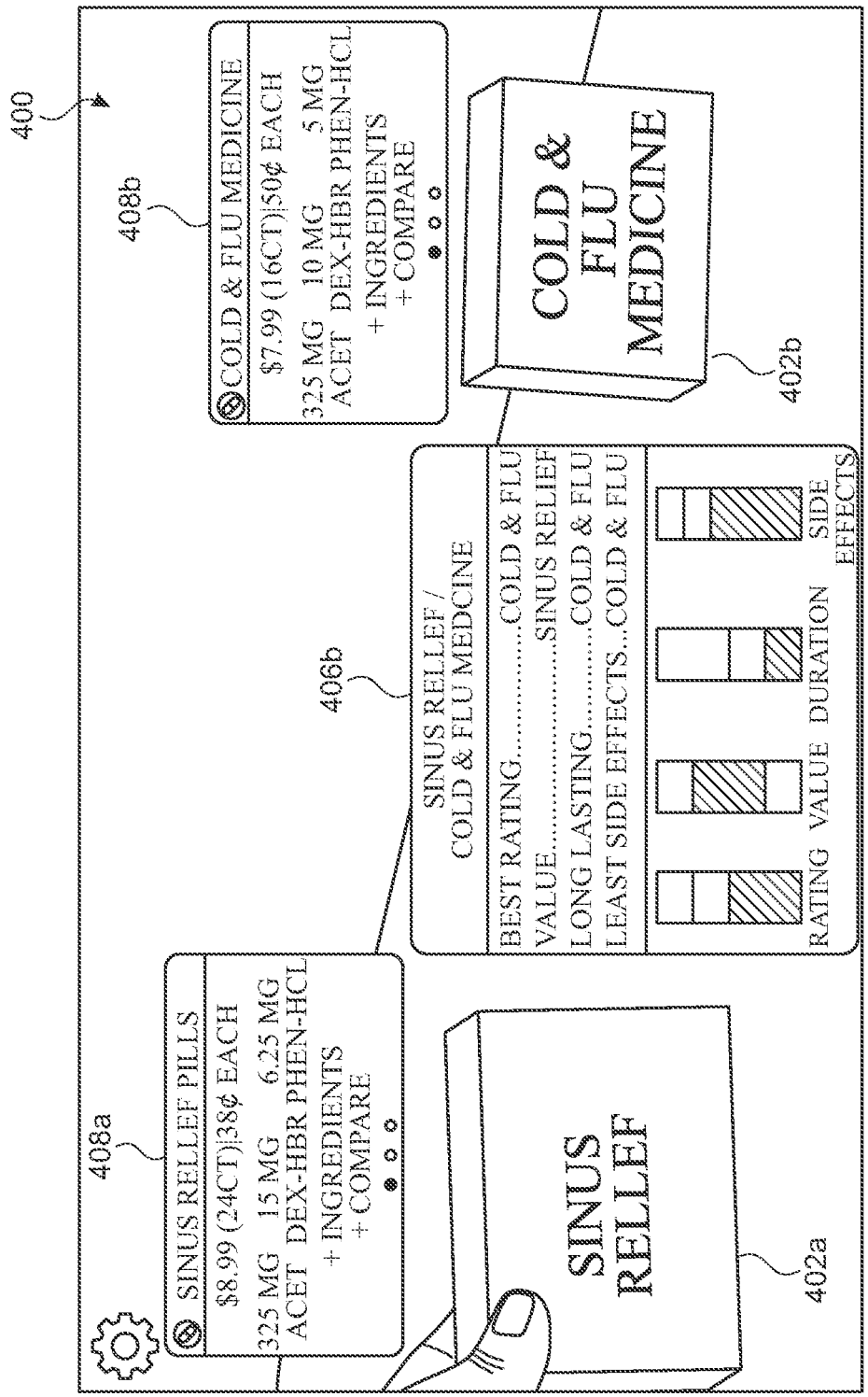
FIG. 4D illustrates an example of detailed information for a first product and a second product being viewed in a CGR environment.

In some embodiments, while displaying comparison information 406a or 406b, additional detailed information about products 402a or 402b is displayed. FIG. 4D illustrates an example of detailed information 408a for product 402a being viewed in CGR environment 400, and detailed information 408b for product 402b also being viewed in CGR environment 400. As shown in FIG. 4D, detailed information 408a and 408b are displayed with comparison information 406b. Detailed information 408a and 408b include one or more specific product characteristics for the respective products 402a and 402b, such as retail price, features of the products, ingredients, nutrition information, allergy information, directions for use, drug interaction information, environmental rating, and user rating. In some embodiments, detailed information 408a and 408b are displayed using one or more of the techniques described in reference to FIGS. 2A-2I.

In some embodiments, detailed information 408a is displayed in response to detecting a distance between product 402a and device 100a is less than a second threshold distance (e.g., product 402a is closer to image sensor(s) 108 of device 100a in FIG. 4D than in FIG. 4C). Similarly, in some embodiments, detailed information 408b is displayed in response to detecting a distance between product 402b and device 100a is less than the second threshold distance (e.g., product 402b is closer to image sensor(s) 108 of device 100a in FIG. 4D than in FIG. 4C). For example, if product 402a is detected in the field of view of device 100a at a distance greater than the second threshold distance but less than the first threshold distance, then product information 404a is displayed as shown in FIG. 4C. If the distance to product 402a is reduced to less than the second threshold distance, then detailed information 408a is displayed, as shown in FIG. 4D. In some embodiments, detailed information 408a is displayed at a position relative to product 402a in the CGR environment 400. As device 100a or product 402a moves, the position of detailed information 408a relative to product 402a remains constant (e.g., detailed information 408a continues to appear above product 402a in the CGR environment 400 as product 402a is moved by a user). Similarly, as device 100a or product 402b moves, the position of detailed information 408b relative to product 402b remains constant.

In some embodiments, detailed information 408a is displayed in response to detecting movement of product 402a relative to device 100a (e.g., relative to image sensor(s) 108 of device 100a). For example, when a user picks up product 402a, the motion of product 402a relative to device 100a is detected. In response to this motion, detailed information 408a is displayed. Similarly, in some embodiments, detailed information 408b is displayed in response to detecting movement of product 402b relative to device 100a (e.g., relative to image sensor(s) 108 of device 100a).

In some embodiments, detailed information 408a is displayed in response to detecting a gesture associated with product 402a. For example, when a user moves product 402a in a specific manner, detailed information 408a is displayed. The specific manner of movement of product 402a includes an upward movement, a movement toward the user's head, or any other movement to indicate the user is interested in viewing detailed information about product 402a. Similarly, in some embodiments, detailed information 408b is displayed in response to detecting a gesture associated with product 402b.

In some embodiments, comparison information 406a or 406b is displayed concurrently with detailed information 408a or 408b. Comparison information 406a or 406b is displayed concurrently with detailed information 408a or 408b when product 402a is within the threshold distance of product 402b, and one or more of the techniques for displaying detailed information 408a or 408b described above is carried out.

Figure 4E:
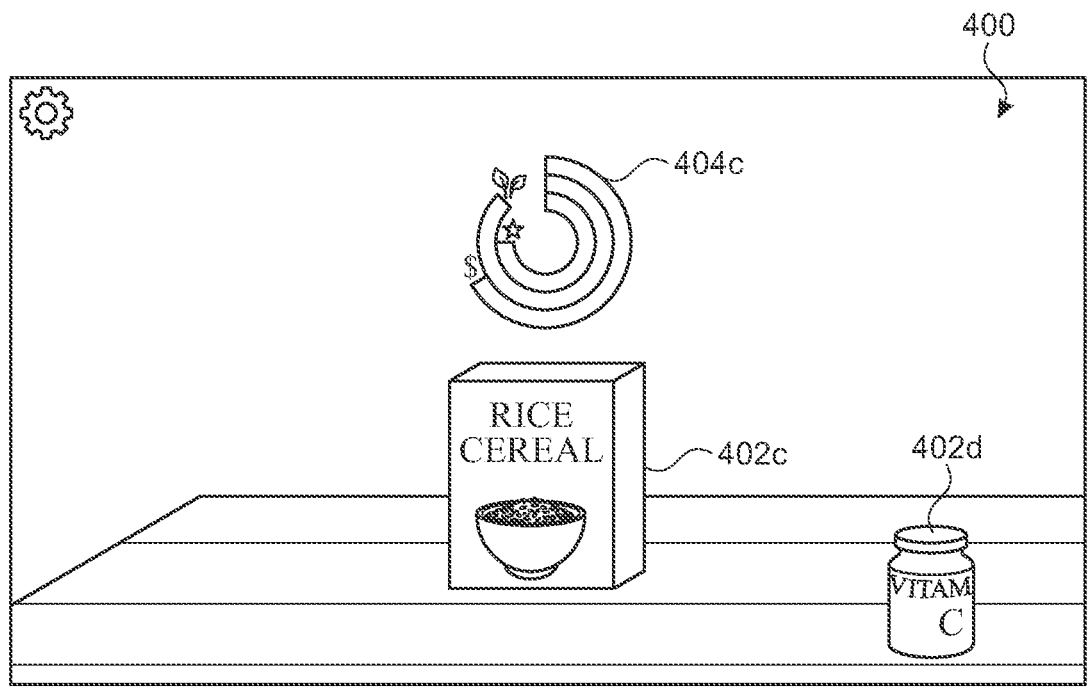
FIG. 4E illustrates an example of two products from different categories being viewed in a CGR environment.

FIG. 4E illustrates an example of two products 402c and 402d being viewed in the CGR environment 400. In the embodiment shown in FIG. 4E, product 402c is in a different category of product from product 402d (e.g., product 402c is cereal and product 402d is vitamins). When device 100a determines that a movement of product 402c relative to product 402d causes product 402c to come within the threshold distance of product 402d, no comparison information is displayed since the products are in different categories.

Figure 4F:
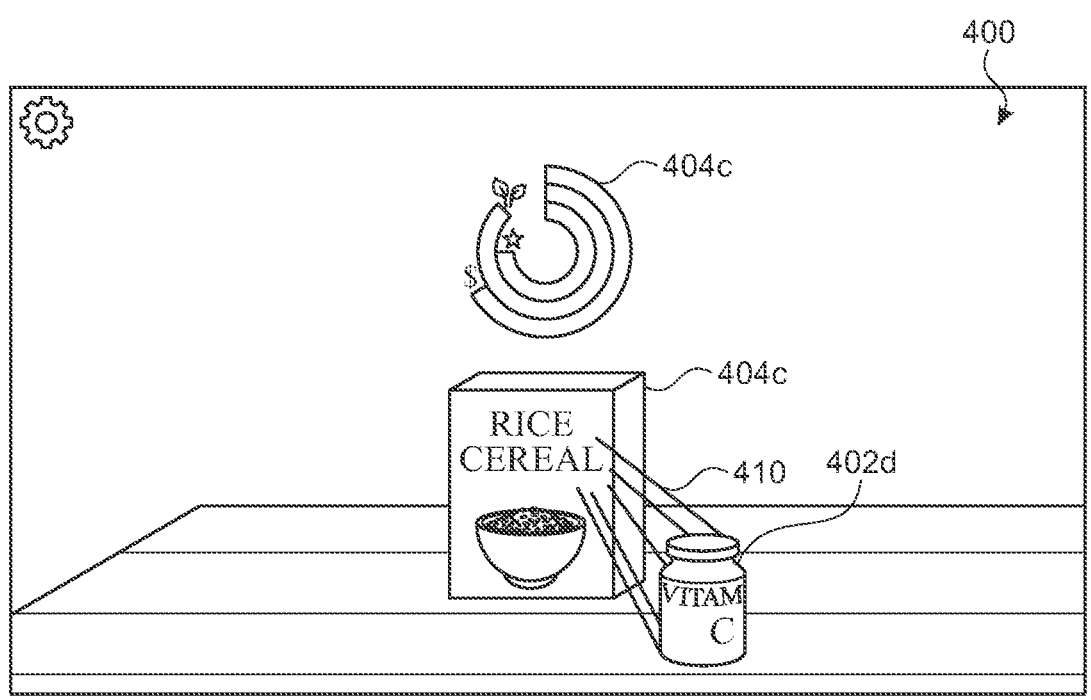
FIG. 4F illustrates an example of a notification indicating an incompatibility between two products.

In some embodiments, as shown in FIG. 4F, notification 410 indicating the incompatibility between the products is displayed when device 100a determines that product 402c is within the threshold distance of product 402d. Notification 410 indicates that the products 402c and 402d are within a threshold distance from each other, but that no comparison information is available for display. In some embodiments, notification 410 includes a line or beam connecting product 402c with product 402d in CGR environment 400. In some embodiments, notification 410 continues to be displayed while product 402c and 402d move relative to each other.

Figure 5:
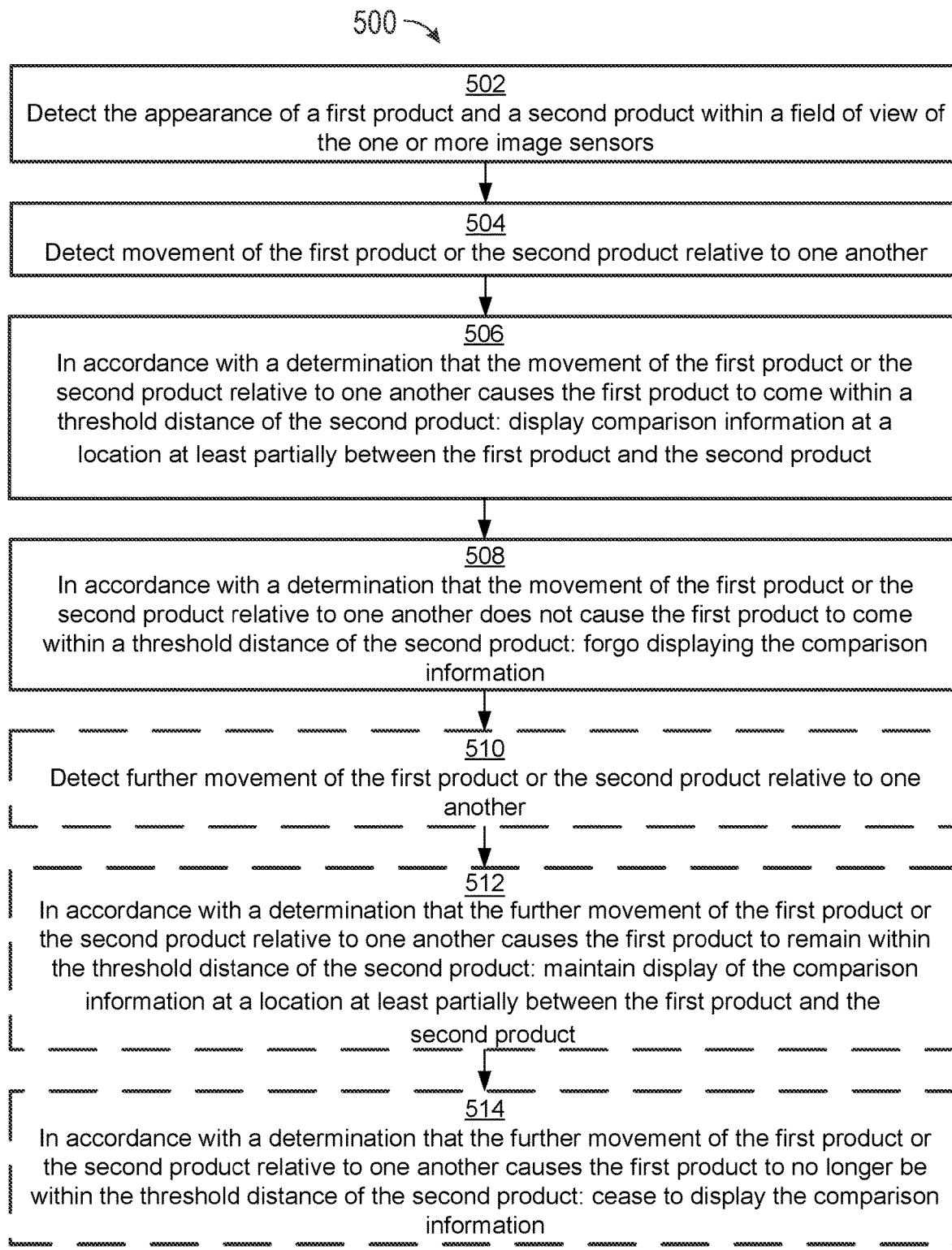
FIG. 5 is a flow diagram illustrating a method for providing product comparison information using an electronic device in accordance with some embodiments.

FIG. 5 is a flow diagram illustrating a method for providing product comparison information using an electronic device in accordance with some embodiments. Method 500 is performed at a device (e.g., 100a) with a display (e.g., 120) and one or more image sensors (e.g., 108). Some operations in method 500 are, optionally, combined, the orders of some operations are, optionally, changed, and some operations are, optionally, omitted.

As described below, method 500 provides an intuitive way for providing product comparison information. The method reduces the cognitive burden on a user for comparing attributes of two products, thereby creating a more efficient human-machine interface. For battery-operated computing devices, enabling a user to view product comparison information faster and more efficiently conserves power and increases the time between battery charges.

At block 502, the appearance of a first product (e.g., 402a) and a second product (e.g., 402b) within a field of view of one or more image sensors (e.g., 108) is detected. In some embodiments, first product information (e.g., 404a) associated with the first product (e.g., 402a) is displayed (e.g., in CGR environment 400). In some embodiments, first product information (e.g., 404*a*) associated with the first product (e.g., 402*a*) and second product information (e.g., 404*b*) associated with the second product (e.g., 402*b*) are displayed (e.g., in CGR environment 400). In some embodiments, the first product information is displayed (e.g., in CGR environment 400) at a position relative to the first product (e.g., 402*a*). In some embodiments, the first product information (e.g., 404*a*) is displayed in response to a distance between the first product (e.g., 402*a*) and the one or more image sensors (e.g., 108) being less than a second threshold distance. In some embodiments, the first product information (e.g., 404*a*) is displayed in response to detecting movement of the first product (e.g., 402) relative to the one or more image sensors (e.g., 108). In some embodiments, the first product information (e.g., 404*a*) is displayed in response to detecting a gesture associated with the product (e.g., a specific movement of product 404*a*).

At block 504, movement of the first product (e.g., 402*a*) or the second product (e.g., 402*b*) relative to one another is detected. In some embodiments, the relative position of the first product information (e.g., 404*a*) to the first product (e.g., 402*a*) is maintained during movement of the first product (e.g., 402*a*).

At block 506, in accordance with a determination that the movement of the first product (e.g., 402*a*) or the second product (e.g., 402*b*) relative to one another causes the first product (e.g., 402*a*) to come within a threshold distance of the second product (e.g., 402*b*), comparison information (e.g., 406*a* or 406*b*) is displayed (e.g., in CGR environment 400) at a location at least partially between the first product (e.g., 402*a*) and the second product (e.g., 402*b*). In some embodiments, the comparison information (e.g., 406*a* or 406*b*) includes one or more of price, features, ingredients, nutrition information, allergy information, directions for use, drug interaction information, environmental rating, and user rating.

In some embodiments, the comparison information is displayed (e.g., in CGR environment 400) at a location at least partially between the first product and the second product during movement of the first product (e.g., 402*a*) or the second product (e.g., 402*b*). In some embodiments, display of the first product information (e.g., 404*a*) is maintained while displaying the comparison information (e.g., 406*a* or 406*b*). In some embodiments, display of the first product information (e.g., 404*a*) and second product information (e.g., 404*b*) is maintained while displaying the product comparison information (e.g., 406*a* or 406*b*).

At block 508, in accordance with a determination that the movement of the first product (e.g., 402*a*) or the second product (e.g., 402*b*) relative to one another does not cause the first product (e.g., 402*a*) to come within a threshold distance of the second product (e.g., 402*b*), display of the comparison information (e.g., 406*a* or 406*b*) is forgone. In some embodiments, in accordance with a determination that the first product (e.g., 402*a*) and the second product (e.g., 402*b*) are not in compatible product categories, display of the comparison information (e.g., 406*a* or 406*b*) is forgone. In some embodiments, in accordance with the determination that the first product and the second product are not in compatible product categories, a notification (e.g., 410) indicating the incompatibility is displayed.

In some embodiments, at block 510, further movement of the first product (e.g., 402*a*) or the second product (e.g., 402*b*) relative to one another is detected.

In some embodiments, at block 512, in accordance with a determination that the further movement of the first product (e.g., 402*a*) or the second product (e.g., 402*b*) relative to one another causes the first product (e.g., 402*a*) to remain within the threshold distance of the second product (e.g., 402*b*), display of the comparison information (e.g., 406*a* or 406*b*) is maintained (e.g., in CGR environment 400) at a location at least partially between the first product (e.g., 402*a*) and the second product (e.g., 402*b*).

In some embodiments, at block 514, in accordance with a determination that the further movement of the first product (e.g., 402*a*) or the second product (e.g., 402*b*) relative to one another causes the first product (e.g., 402*a*) to no longer be within the threshold distance of the second product (e.g., 402*b*), display of the comparison information (e.g., 406*a* or 406*b*) is ceased.

Note that details of the processes described above with respect to method 500 (e.g., FIG. 5 are also applicable in an analogous manner to the methods described above. For example, method 500 optionally includes one or more of the characteristics of the various methods described above with reference to method 300. For example, product information or detailed information can be displayed in method 500 using one or more of the techniques described in method 300. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to provide product information. The present disclosure contemplates that in some instances, this gathered data may include data that uniquely identifies a product for which information is sought. The use of this information, in the present technology, can benefit users. For example, the data can be used to deliver product information that is of greater interest to the user, such as nutritional information.

Entities responsible for the collection, analysis, disclosure, transfer, storage, or other use of such data should comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Product information requests from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such data and ensuring that others with access to the data adhere to their privacy policies and procedures. Further, such entities can subject themselves to evaluation by third parties to certify their adherence to widely accepted privacy policies and practices. In addition, policies and practices should be adapted for the particular types of data being collected and/or accessed and adapted to applicable laws and standards, including jurisdiction-specific considerations. Different privacy practices may need to be maintained for different data types in each country.

Despite the foregoing, the present disclosure also contemplates embodiments in which users can restrict the extent to which product search information is processed. For example, in the case of providing product information tailored to a user's preferences, the present technology can be configured to allow users to select to "opt in" or "opt out" of participation. In addition to providing "opt in" and "opt out" options, the present disclosure contemplates providing notifications relating to the access or use of product information. For instance, a user may be notified upon downloading an app that their product information requests are transmitted to servers that provide search services. Moreover, data de-identification can be used to protect a user's privacy. For example, search requests for product information may be obfuscated by removing specific identifiers (e.g., user name and so forth), controlling the amount or specificity of data stored (e.g., collecting location data at a city level rather than at an address level), controlling how data is stored (e.g., aggregating data across users), and/or other methods.

What is claimed is:

1. An electronic device, comprising:
a display;
one or more image sensors;
one or more processors; and
memory storing one or more programs configured to be executed by the one or more processors, the one or more programs including instructions for:
detecting the appearance of a first product and a second product within a field of view of the one or more image sensors;
detecting movement of the first product or the second product relative to one another;
in accordance with a determination that the movement of the first product or the second product relative to one another causes the first product to come within a threshold distance of the second product:
displaying comparison information at a location at least partially between the first product and the second product when the first product and the second product are in compatible categories; and
forgoing displaying the comparison information when the first product and the second product are not in compatible categories; and
in accordance with a determination that the movement of the first product or the second product relative to one another does not cause the first product to come within a threshold distance of the second product, forgoing displaying the comparison information.

2. The electronic device of claim 1, wherein the comparison information is displayed at a location at least partially between the first product and the second product during movement of the first product or the second product.

3. The electronic device of claim 1, wherein the one or more programs further include instructions for:
detecting further movement of the first product or the second product relative to one another;
in accordance with a determination that the further movement of the first product or the second product relative to one another causes the first product to remain within the threshold distance of the second product:
maintaining display of the comparison information at a location at least partially between the first product and the second product; and
in accordance with a determination that the further movement of the first product or the second product relative to one another causes the first product to no longer be within the threshold distance of the second product:
ceasing to display the comparison information.

4. The electronic device of claim 1, wherein the one or more programs further include instructions for:
in accordance with the determination that the first product and the second product are not in compatible product categories, displaying a notification indicating the incompatibility.

5. The electronic device of claim 1, wherein the one or more programs further include instructions for:
displaying first product information associated with the first product.

6. The electronic device of claim 5, wherein the one or more programs further include instructions for:
maintaining display of the first product information while displaying the comparison information.

7. The electronic device of claim 5, wherein the first product information is displayed at a position relative to the first product.

8. The electronic device of claim 7, wherein the relative position of the first product information is maintained during the movement of the first product.

9. The electronic device of claim 5, wherein the first product information is displayed in response to a distance between the first product and the one or more image sensors being less than a second threshold distance.

10. The electronic device of claim 5, wherein the first product information is displayed in response to detecting movement of the first product relative to the one or more image sensors.

11. The electronic device of claim 5, wherein the first product information is displayed in response to detecting a gesture associated with the product.

12. The electronic device of claim 1, wherein the one or more programs further include instructions for:
displaying first product information associated with the first product and second product information associated with the second product.

13. The electronic device of claim 12, wherein the one or more programs further include instructions for:
maintaining display of the first and second product information while displaying the product comparison information.

14. The electronic device of claim 1, wherein the comparison information includes one or more of price, features, ingredients, nutrition information, allergy information, directions for use, drug interaction information, environmental rating, and user rating.

15. A non-transitory computer-readable storage medium storing one or more programs configured to be executed by one or more processors of an electronic device with a display and one or more image sensors, the one or more programs including instructions for:
detecting the appearance of a first product and a second product within a field of view of the one or more image sensors;

detecting movement of the first product or the second product relative to one another;
in accordance with a determination that the movement of the first product or the second product relative to one another causes the first product to come within a threshold distance of the second product;
   displaying comparison information at a location at least partially between the first product and the second product when the first product and the second product are in compatible categories; and
   forgoing displaying the comparison information when the first product and the second product are not in compatible categories; and
in accordance with a determination that the movement of the first product or the second product relative to one another does not cause the first product to come within a threshold distance of the second product, forgoing displaying the comparison information.

16. The non-transitory computer-readable storage medium of claim 15, wherein the one or more programs further include instructions for:
   detecting further movement of the first product or the second product relative to one another;
   in accordance with a determination that the further movement of the first product or the second product relative to one another causes the first product to remain within the threshold distance of the second product:
      maintaining display of the comparison information at a location at least partially between the first product and the second product; and
   in accordance with a determination that the further movement of the first product or the second product relative to one another causes the first product to no longer be within the threshold distance of the second product:
      ceasing to display the comparison information.

17. The non-transitory computer-readable storage medium of claim 15, wherein the one or more programs further include instructions for:
   displaying first product information associated with the first product.

18. The non-transitory computer-readable storage medium of claim 17, wherein the first product information is displayed in response to a distance between the first product and the one or more image sensors being less than a second threshold distance.

19. The non-transitory computer-readable storage medium of claim 17, wherein the first product information is displayed in response to detecting movement of the first product relative to the one or more image sensors.

20. The non-transitory computer-readable storage medium of claim 17, wherein the first product information is displayed in response to detecting a gesture associated with the product.

21. A method for providing product information, comprising:
   at an electronic device with a display and one or more image sensors:
   detecting the appearance of a first product and a second product within a field of view of the one or more image sensors;
   detecting movement of the first product or the second product relative to one another;
   in accordance with a determination that the movement of the first product or the second product relative to one another causes the first product to come within a threshold distance of the second product:
      displaying comparison information at a location at least partially between the first product and the second product when the first product and the second product are in compatible categories; and
      forgoing displaying the comparison information when the first product and the second product are not in compatible categories; and
   in accordance with a determination that the movement of the first product or the second product relative to one another does not cause the first product to come within a threshold distance of the second product, forgoing displaying the comparison information.

22. The method of claim 21, further comprising:
   displaying first product information associated with the first product.

23. The method of claim 22, wherein the first product information is displayed in response to a distance between the first product and the one or more image sensors being less than a second threshold distance.

24. The method of claim 22, wherein the first product information is displayed in response to detecting movement of the first product relative to the one or more image sensors.

25. The method of claim 22, wherein the first product information is displayed in response to detecting a gesture associated with the product.

* * * * *